United States Patent
Wang et al.

(10) Patent No.: US 11,943,080 B2
(45) Date of Patent: Mar. 26, 2024

(54) METHOD FOR ESTIMATING DENSE MULTIPATH PARAMETERS BY MEANS OF MULTIPOLARIZED BROADBAND EXTENDED ARRAY RESPONSES

(71) Applicant: Southeast University, Jiangsu (CN)

(72) Inventors: Haiming Wang, Suzhou (CN); Bensheng Yang, Suzhou (CN); Peize Zhang, Suzhou (CN); Chen Yu, Suzhou (CN); Wei Hong, Suzhou (CN)

(73) Assignee: Southeast University, Jiangsu (CN)

( * ) Notice: Subject to any disclaimer, the term of this patent is extended or adjusted under 35 U.S.C. 154(b) by 373 days.

(21) Appl. No.: 17/611,179

(22) PCT Filed: Mar. 17, 2021

(86) PCT No.: PCT/CN2021/081350
§ 371 (c)(1),
(2) Date: Nov. 15, 2021

(87) PCT Pub. No.: WO2022/016888
PCT Pub. Date: Jan. 27, 2022

(65) Prior Publication Data
US 2022/0311645 A1    Sep. 29, 2022

(30) Foreign Application Priority Data
Jul. 24, 2020   (CN) .......................... 202010721612.5

(51) Int. Cl.
*H04L 12/50*   (2006.01)
*H04L 25/02*   (2006.01)

(52) U.S. Cl.
CPC ............................... *H04L 25/0204* (2013.01)

(58) Field of Classification Search
CPC ............................ H04L 12/28; H04L 25/0204
(Continued)

(56) References Cited

U.S. PATENT DOCUMENTS 11,516,689 B2 * 11/2022 Hu .................. H04W 24/04

FOREIGN PATENT DOCUMENTS

| CN | 103703730 | 4/2014 |
|---|---|---|
| CN | 107645460 | 1/2018 |

(Continued)

OTHER PUBLICATIONS

"International Search Report (Form PCT/ISA/210) of PCT/CN2021/081350," dated Jun. 16, 2021, pp. 1-4.

(Continued)

*Primary Examiner* — Dang T Ton
(74) *Attorney, Agent, or Firm* — JCIP GLOBAL INC.

(57) ABSTRACT

Disclosed is a method for estimating dense multipath parameters by means of multipolarized broadband extended array responses, which includes: first transmitting multiple different transmitted signal sequences via a multipolarized antenna array, and processing received data in multiple snapshots according to the known transmitted signals, to obtain channel responses of multipolarized antenna components at all frequency points in a frequency band; extending the obtained channel response matrixes of multiple frequency points in multiple snapshots into a large two-dimensional channel response matrix; then, acquiring a delay parameter regarding multipath propagation by using a reference array element, and estimating two-dimensional departure and arrival angles by using a channel matrix subjected to frequency domain smoothing and dimensionality reduction; and afterwards, pairing the estimated departure and arrival angles, and estimating parameters such as the cross-polarization ratios, the initial phases, and the amplitudes of the sub-paths by using the estimated parameters.

5 Claims, 9 Drawing Sheets

(58) Field of Classification Search
USPC .................................. 370/329, 400, 401, 395
See application file for complete search history.

(56) References Cited

FOREIGN PATENT DOCUMENTS

| CN | 109738916 | 5/2019 |
| CN | 112054972 | 12/2020 |

OTHER PUBLICATIONS

"Written Opinion of the International Searching Authority (Form PCT/ISA/237) of PCT/ CN2021/081350," dated Jun. 16, 2021, pp. 1-4.
Bensheng Yang et al., "Efficient Delay and AoA Estimation Using Vector Antenna for Radio Propagation Measurements," 2019 IEEE International Symposium on Antennas and Propagation and USNC-URSI Radio Science Meeting, Dec. 2019, pp. 2125-2126.

\* cited by examiner

METHOD FOR ESTIMATING DENSE MULTIPATH PARAMETERS BY MEANS OF MULTIPOLARIZED BROADBAND EXTENDED ARRAY RESPONSES

CROSS-REFERENCE TO RELATED APPLICATION

This application is a 371 of international application of PCT application serial no. PCT/CN2021/081350, filed on Mar. 17, 2021, which claims the priority benefit of China application no. 202010721612.5, filed on Jul. 24, 2020. The entirety of each of the above mentioned patent applications is hereby incorporated by reference herein and made a part of this specification.

BACKGROUND OF THE DISCLOSURE

1. Field of the Disclosure

The present disclosure relates to a method for estimating dense multipath parameters by means of multipolarized broadband extended array responses, which can be applied in the fields such as measurement of radio wave propagation characteristics, indoor positioning, and the like.

2. Description of Related Art

In the past few decades, multipath parameter estimation methods have been widely studied, among which there are many well-known classical algorithms, such as estimation of signal parameter via rotational invariance techniques (ES-PRIT), multiple signal classification (MUSIC), space-alternating generalized expectation-maximization (SAGE), and the like. Due to the complexity of the multipath transmission environment, when arriving at a receiver through a multipath channel, the transmitted signal is usually accompanied by complex propagation characteristics, for example, an overlap effect of multiple sub-paths in the time domain, which causes the multiple sub-paths to reach the receiver at very close or even the same time intervals. In space, the departure and arrival angles of these sub-paths are also dense. Thus, it is difficult to resolve these sub-paths in the time domain, and further their characteristics also make it challenging to resolve them in the space domain. In the conventional processing manner, these sub-paths are subjected to smoothing preprocessing in the space domain, and finally their space-domain angle information is obtained by means of ESPRIT or MUSIC. However, the number of sub-paths resolved in this manner is usually limited by the number of antenna array elements, and generally, the number of resolved sub-paths is less than the number of the array elements. The increase in the number of antennas brings a rise in system complexity, making it difficult to effectively resolve a large number of sub-paths in the space. The known conventional multipath parameter estimation methods cannot effectively complete parameter estimation of a large number of sub-paths.

Due to the influence of the complex propagation environment, the polarization characteristics in the radio wave propagation environment become abundant, and the cross-polarization ratios of sub-paths can well reflect the polarization changes of these sub-paths. However, in a currently known method, the cross-polarization ratio is generally acquired by means of a 90-degree turn of the antenna. Such a method is relatively rough and time-consuming, and obtains less accurate results.

SUMMARY OF THE DISCLOSURE

Invention objective: In view of the foregoing problems, the present disclosure aims to provide a method for estimating dense multipath parameters by means of multipolarized broadband extended array responses, which can estimate a sub-path delay, two-dimensional departure angle, and two-dimensional arrival angle under the condition that the number of sub-paths in a time resolvable path is larger than the number of array elements in a dense multipath environment, and can further estimate parameters such as an initial phase, the amplitude, and a cross-polarization ratio.

Technical solution: To achieve the foregoing invention objective, the present disclosure adopts the following technical solution:

A method for estimating dense multipath parameters by means of multipolarized broadband extended array responses is provided, and includes the following steps:

(1) transmitting multiple different transmitted signal sequences via a multipolarized antenna array, where the number of the sequences is equal to the number of transmitting antennas, each transmitted signal sequence is divided into different segments, the number of the segments in each signal sequence is not less than the number of the transmitting antennas, and the length of each segment of signal sequence is not less than the number of Discrete Fourier Transform (DFT) points; and processing received data in multiple snapshots according to the known transmitted signals, to obtain channel responses of multi-polarization components at all frequency points in a frequency band;

(2) vectorizing the obtained channel responses at the multiple frequency points in each snapshot into a column vector, and arranging the channel responses in different snapshots into a two-dimensional matrix, where each column in this two-dimensional matrix is corresponding to a response in a snapshot, and each row indicates a response of a certain receiving and transmitting array element pair at a certain frequency point in multiple snapshots;

(3) estimating and acquiring a delay parameter regarding multipath propagation by using reference array elements; and (4) selecting rows related to receiver reference array elements from the two-dimensional matrix described in step (2) to form a matrix, selecting rows related to transmitter reference array elements to form another matrix, reducing the dimensionality of the channel matrix of each above matrix by means of frequency domain smoothing, and estimating two-dimensional departure and arrival angles by using the channel matrix subjected to dimensionality reduction.

Preferably, different transmitted signal sequences of which the number is identical with the number of transmitting antennas are constructed, each transmitted signal sequence is divided into multiple subsequence segments, and the sequences are not required to be orthogonal as long as each subsequence matrix of a signal has full rank in the frequency domain.

Preferably, each column of the re-built channel response matrix contains responses of each polarized receiving and transmitting array element at all frequency points, and the number of columns of the channel matrix is equal to the number of snapshots.

Preferably, the frequency domain smoothing refers to grouping all the frequency points into multiple sets of frequency points with the same length at equal intervals; and adding the array channel responses corresponding to these sets of frequency points and performing averaging, to obtain a channel response matrix with a less number of rows, where each row of the channel matrix subjected to dimensionality reduction represents a sum of channel responses at the corresponding added frequency points, and the number of columns of the channel response matrix remains unchanged.

Further, the parameter estimation method further includes: estimating parameters such as the initial phase, the amplitude, and the cross-polarization ratio, which is specifically as follows: building an array response by using the estimated angle and delay parameters; obtaining a matrix containing the cross-polarization ratio, the amplitude in each snapshot, and the initial phase of each polarization combination by using the least square method; calculating the argument for this matrix, to obtain initial phases of horizontal and vertical polarization combinations of all sub-paths; calculating the cross-polarization ratio by using a relationship between each column of the obtained matrix and the cross-polarization ratio; and finally, estimating amplitude information of each sub-path in different snapshots by using the least square method.

Advantageous effects: Compared to the prior art, the present disclosure has the following advantages: (1) The present disclosure can estimate parameters regarding the space domain (two-dimensional departure and arrival angles), the initial phase, the amplitude, and the polarization domain (the cross-polarization ratio) of sub-paths irresolvable in the delay domain by means of broadband extended array responses. (2) In the same time resolvable path, the number of resolvable sub-paths is larger than the number of array elements, breaking the limit of the number of array elements on an estimated number of the sub-paths. (3) The method of the present disclosure can reduce the design complexity of a channel measurement system, and has low requirements for the spacing between the array elements, so that the spacing between the array elements can be larger than a half-carrier wavelength.

DESCRIPTION OF THE EMBODIMENTS

The present disclosure is further elucidated below with reference to the accompanying drawings and a specific embodiment. In this specific embodiment, the multipolarized antenna is a distributed Electromagnetic Vector Antenna (EMVA) with the most comprehensive polarization. It should be understood that, the embodiment is merely used to describe the present disclosure, but is not intended to limit the scope of the present disclosure. Various equivalent modifications made to the present disclosure by those skilled in the art after reviewing the present disclosure shall all fall within the scope limited by the appended claims of the present application. The term "plurality" means two or more than two. Contents not described in detail in the embodiment of the present disclosure belong to the prior art.

The present disclosure discloses a method for estimating dense multipath parameters by means of multipolarized broadband extended array responses, which can effectively estimate multipath parameters in a dense multipath environment, including but not limited to, estimation of parameters related to sub-paths of which the number is larger than the number of array elements in a time resolvable path (which is briefly referred to as a "path" below). In the method, multiple different transmitted signal sequences are first transmitted via a multipolarized antenna array, and received data in multiple snapshots is processed according to the known transmitted signals, to obtain channel responses of multi-polarization components at all frequency points in a frequency band. The obtained channel responses at the multiple frequency points in each snapshot are vectorized into a column vector, and the channel responses in different snapshots are arranged into a two-dimensional matrix. Then, an estimation of the delay parameter is acquired according to the frequency-domain channel response of a reference array element pair. The delay parameter can be acquired by using a subspace method such as MUSIC or ESPRIT, and then an estimation of two-dimensional angle information of the receiver and transmitter is obtained by means of the delay parameter and frequency domain smoothing. Herein, two-dimensional angular spectrum peaks are searched for by means of MUSIC, and an array response is built by using the estimated delay and angle parameters; and then a matrix containing the cross-polarization ratio, the amplitude in each snapshot, and the initial phase of each polarization combination is obtained by using the least square method. The argument for this matrix is calculated, to obtain initial phases of horizontal and vertical polarization combinations of all sub-paths; then, the cross-polarization ratio is estimated by using a relationship between each column of the obtained matrix and the cross-polarization ratio; and finally, amplitude information of each sub-path in different snapshots is estimated by using the least square method. The extraction principle of specific parameters in the present disclosure falls within the scope of the conventional subspace algorithms.

Figure 1:
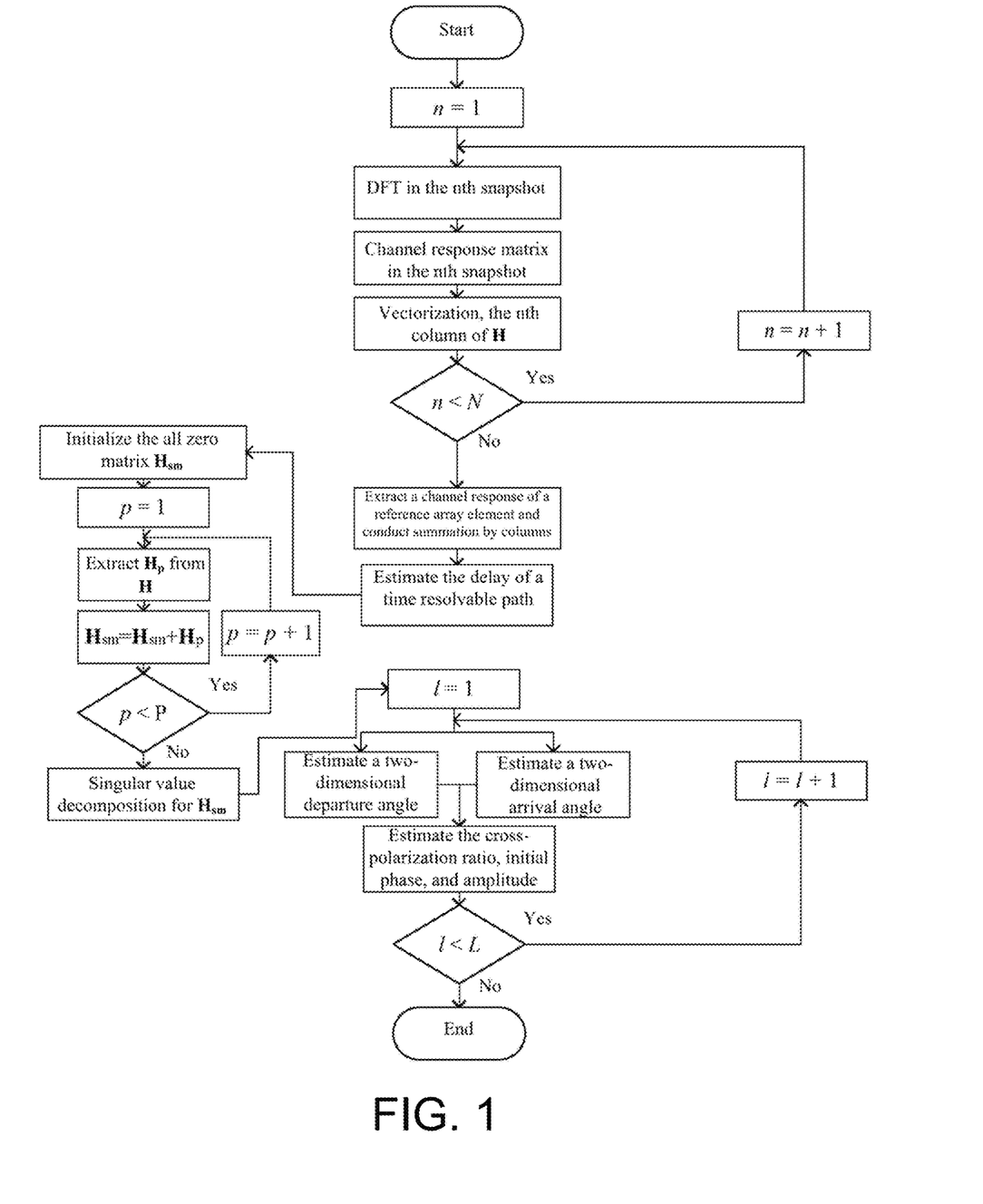
FIG. 1 is a flowchart of an estimation method in an embodiment of the present disclosure.

FIG. 1 is a flowchart of an estimation method in an embodiment of the present disclosure, where H denotes a channel response matrix of all frequency points, Hsm denotes a channel response matrix subjected to smoothing and dimensionality reduction, P denotes the number of smoothing operations, N denotes the number of snapshots, and L denotes the number of paths resolvable in the time domain. The corresponding specific implementation steps are as follows:

(1) Multiple different transmitted signal sequences are transmitted via a multipolarized antenna array, and received data in multiple snapshots is processed according to the known transmitted signal sequences, to obtain channel responses of multi-polarization components at all frequency points in a frequency band. The following sub-steps are included:

1) Structural Design of the Transmitted Signal Sequence

Figure 2:
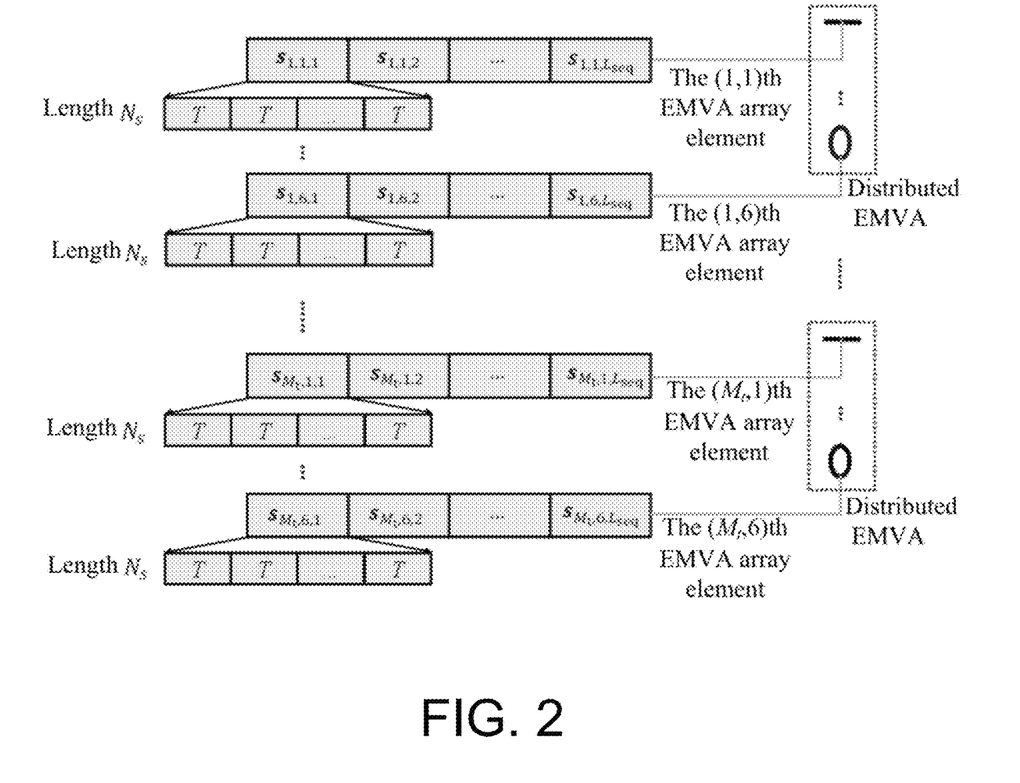
FIG. 2 is a schematic structural diagram of transmitted signals in the embodiment of the present disclosure.

FIG. 2 is a schematic structural diagram of transmitted signals required in the present disclosure, where $M_t$ denotes the number of the transmitting EMVAs, and $(m_t, x)$ denotes the xth component of the $m_t$th distributed EMVA. $Sm_{2,x,l_{seq}}$ in the figure indicates the $1_{seq}$th subsequence signal transmitted by the $(m_t,x)$th polarized antenna component. T is the symbol width for compact expression. In this embodiment, the transmitted signal sequence has $6M_t$ sets of different transmitted signals in total, and each transmitted signal set is composed of $L_{seq}$ subsequences, where $L_{seq} \geq 6M_t$; and each subsequence has a length equal to that of Ns code element symbols, namely, the number of DFT points.

2) Selection of a Channel Transmission Model

Figure 3:
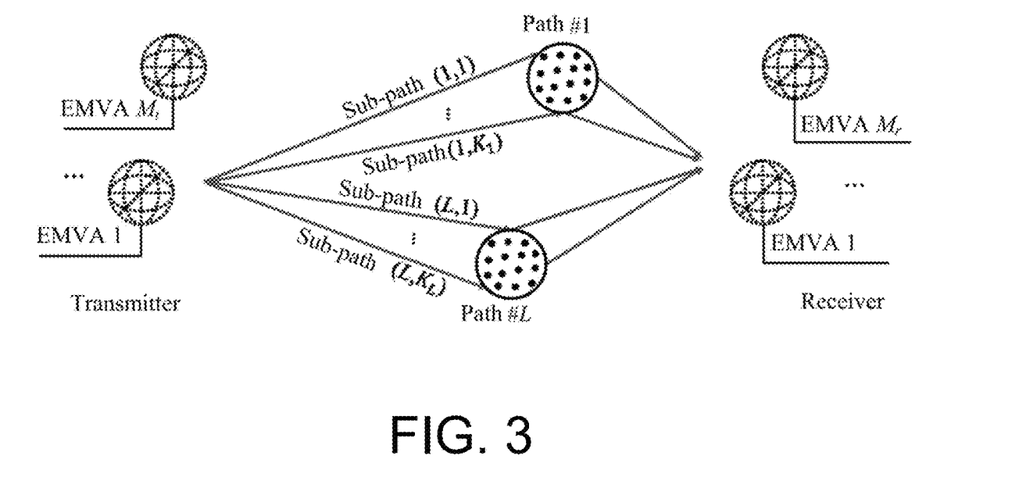
FIG. 3 is a schematic diagram of a channel transmission background applied in the embodiment of the present disclosure.

A transmission model used in the present disclosure is shown in FIG. 3, where each sub-path is denoted by a pair of numerals in the parentheses. For example, $(1, k_l)$ denotes the $k_l$th sub-path of the first path. The number of the sub-paths in the first path is denoted by $k_l$, and it is assumed herein that there are $K = \Sigma_{l=1}^{L} K_l$ sub-paths in total in the broadcast environment. $M_r$ in the figure denotes the number of receiving EMVAs.

3) Establishment of an Expression Regarding Received Signals $$y_{n,n_s,l_{seq}}(\tau, \Theta_r, \Theta_t, \Xi) = \sum_{l=1}^{L} \sum_{k=1}^{K_l} \alpha_{n,lk} a_{r,f}(\Theta_{r,lk}) \otimes \left[ g_r^T(\Theta_{r,lk}) \oplus A_{pdr,f}^T(\Theta_{r,lk}) \right]^T T(\Xi_{lk}) \cdot \quad \text{(Formula 1)}$$

$$a_{t,f}^T(\Theta_{t,lk}) \otimes \left[ g_t^T(\Theta_{t,lk}) \oplus A_{pdt,f}^T(\Theta_{t,lk}) \right] s_{l_{seq},n_s}(n_s T - \tau_l) + z_n$$

The foregoing formula is an expression of the $n_s$th symbol of the received $1_{seq}$th subsequence in the nth snapshot, where the operator $\otimes$ denotes the Kronecker product operation, and the operator $\oplus$ denotes the Kronecker product by columns; the subscript f denotes the frequency and the superscript T denotes transpose of a matrix; $Z_n$ denotes the noise of the nth snapshot; $g_t$ and $g_r$ respectively denote pattern gains of the transmitter and receiver EMVAs in $\Theta_{t,lk}$ directions; the variable T denotes the code element width of the transmitted sequence, and $\tau_l$ denotes the delay parameter of the first path; and $\alpha_{n,lk}$ denotes the amplitude of the kith sub-path in the nth snapshot. The involved parameters $\tau$, $\Theta_r$, $\Theta_t$, and $\Xi$ respectively denote the path delay, the two-dimensional arrival angles of all sub-paths, the two-dimensional transmitting angles, and a polarization parameter set, and some parameters are defined as follows:

$$\begin{cases} \Theta_r \triangleq [\varphi_r, \theta_r] \\ \Theta_t \triangleq [\varphi_t, \theta_t] \\ \Xi \triangleq \{\kappa, \omega^{hh}, \omega^{hv}, \omega^{vh}, \omega^{vv}\} \end{cases} \quad \text{(Formula 2)}$$

$\varphi_r$ denotes the azimuth angle of arrival (AAoA), $\varphi_t$ denotes the azimuth angle of departure (AAoD), $\theta_r$ denotes the elevation angle of arrival (EAoA), and $\theta_t$ denotes the elevation angle of departure (EAoD); $\kappa$ denotes the cross-polarization ratio; $\omega^{hh}$, $\omega^{hv}$, $\omega^{Vh}$, and $\omega^{vv}$ are initial phases of horizontal and vertical four polarization combinations; and $a_t(f, \Theta_{t,lk})$ and $A_{pdt}(f, \Theta_{t,lk})$ (namely, $a_{t,f}(\Theta_{t,lk})$ and $A_{pdt,f}(\Theta_{t,lk})$ in Formula 1, where f is put into the parentheses to reflect the dependence on frequency) respectively denote the steering vector in the spatial frequency domain of the EMVA array of the transmitter and a joint steering matrix in the spatial domain and polarization domain of the distributed EMVA array element of the transmitter. For the transmitter, expressions of $a_t(f, \Theta_{t,lk})$ and $A_{pdt}(f, \Theta_{t,lk})$ may be respectively written as follows:

$$\begin{cases} a_t(f, \Theta_{t,lk}) = \left[ e^{-j2\pi f r_1 u_{t,lk}(\Theta_{t,lk})/c}, \ldots, e^{-j2\pi f r_{M_t} u_{t,lk}(\Theta_{t,lk})/c} \right]^T \\ A_{pdt}(f, \Theta_{t,lk}) = D_t(f, \Theta_{t,lk}) \Omega_t(\Theta_{t,lk}) \end{cases} \quad \text{(Formula 3)}$$

$r_{m_t}$ and $u_{t,lk}$ respectively denote the coordinates of the $m_t$th EMVA and the direction cosine of the departure angle of the $k_l$th sub-path. The coordinates herein refer to a three-dimensional row vector in a spatial Cartesian coordinate system, and the direction cosine indicates a unit three-dimensional column vector in this direction. c denotes the propagation speed of electromagnetic waves in the free space. $Dt(f, \Theta_{t, lk})$ is expressed as follows:

$$D_t(f, \Theta_{t,lk}) = \text{diag}[d_{t,lk}(f, \Theta_{t,lk})] \quad \text{(Formula 4)}$$

$d_{t,lk}(f, \Theta_{t, lk})$ denotes a spatial phase shift vector of the distributed EMVA of the transmitter, and $\Omega_t(\Theta_{t, lk})$ denotes a steering matrix in the polarization domain of the EMVA of the transmitter:

$$\begin{cases} d_{t,lk}(f, \Theta_{t,lk}) = \left[ e^{-j2\pi f r_{ex} u_{t,lk}/c}, e^{-j2\pi f r_{ey} u_{t,lk}/c}, \right. \\ \left. e^{-j2\pi f r_{ez} u_{t,lk}/c}, e^{-j2\pi f r_{hx} u_{t,lk}/c}, e^{-j2\pi f r_{hy} u_{t,lk}/c}, \right. \\ \left. e^{-j2\pi f r_{hz} u_{t,lk}/c} \right]^T \\ \Omega_t(\Theta_{t,lk}) = \begin{bmatrix} \cos\varphi_{t,lk}\cos\theta_{t,lk} & -\sin\varphi_{t,lk} \\ \sin\varphi_{t,lk}\cos\theta_{r,lk} & \cos\varphi_{t,lk} \\ -\sin\theta_{t,lk} & 0 \\ -\sin\varphi_{t,lk} & -\cos\varphi_{t,lk}\cos\theta_{t,lk} \\ \cos\varphi_{t,lk} & -\sin\varphi_{t,lk}\cos\theta_{t,lk} \\ 0 & \sin\theta_{t,lk} \end{bmatrix} \end{cases} \quad \text{(Formula 5)}$$

$r_{ex}$, $r_{ey}$, $r_{ez}$, $r_{hx}$, $r_{hy}$, and $r_{hz}$ denote position coordinates of multiple polarized component antennas with respect to the EMVA. For the most comprehensive EMVA, the number of the polarization components is 6, or some may be selected for polarization. For the receiver steering matrix, the subscript 't' in the foregoing expression is replaced with 'r'.

$T(\Xi_{lk})$ denotes a polarization torsion matrix, which can be expressed as follows:

$$T(\Xi_{lk}) = \begin{bmatrix} e^{j\omega_{lk}^{vv}} & \sqrt{\kappa_{lk}^{-1}} e^{j\omega_{lk}^{vh}} \\ \sqrt{\kappa_{lk}^{-1}} e^{j\omega_{lk}^{hv}} & e^{j\omega_{lk}^{hh}} \end{bmatrix} \quad \text{(Formula 6)}$$

where $\omega_{lk}^{hh}$, $\omega_{lk}^{hv}$, $\omega_{lk}^{vh}$, $\omega_{lk}^{vv}$ are initial phases of horizontal and vertical four polarization combinations (hh, hv, vh, vv) of the kith sub-path.

4) Calculation of a Channel Response Corresponding to Each Subsequence

For the nth snapshot, DFT transformation is performed on the received signals in different subsequences, and each subsequence can acquire a channel response at each frequency point. Then, channel responses at the same frequency points are extracted and grouped together. The same operation is performed for all the N snapshots. For example, for the nth snapshot, the multi-polarization response of the ith frequency point is expressed as $H_{n,f_i}$, which has the following expression:

$$H_{n,f_i} = \sum_{l=1}^{L}\sum_{k=1}^{K_l} a_{t,f_i}(\Theta_{t,lk}) \otimes \left[g_t^T(\Theta_{t,lk}) \oplus A_{pdt,f_i}^T(\Theta_{t,lk})\right]^T \otimes a_{r,f_i}(\Theta_{r,lk}) \otimes \left[g_r^T(\Theta_{r,lk}) \oplus A_{pdr,f_i}^T(\Theta_{r,lk})\right]^T vec(T_{lk})\alpha_{n,lk} \quad \text{(Formula 7)}$$

$H_{n,f_i}$ contains multiple polarized channel responses. In the subscript $f_i$ of the present disclosure, i=1, ..., $N_s$, which denotes the ith frequency point. vec in the foregoing formula denotes vectorization operation on the matrix by columns.

(2) Through step (1), the obtained channel responses at the multiple frequency points in each snapshot are vectorized into a column vector, and the channel responses in different snapshots are arranged into a two-dimensional matrix $H \in C^{36M_VM_YN_S \times N}$, which is shown in the following form:

$$H = \begin{bmatrix} vec(H_{1,f_1}) & vec(H_{2,f_1}) & \ldots & vec(H_{N,f_1}) \\ vec(H_{1,f_2}) & vec(H_{2,f_2}) & \ldots & vec(H_{N,f_2}) \\ \vdots & \vdots & \ddots & \vdots \\ vec(H_{1,f_{N_s}}) & vec(H_{2,f_{N_s}}) & \ldots & vec(H_{N,f_{N_s}}) \end{bmatrix} \quad \text{(Formula 8)}$$

Figure 5:
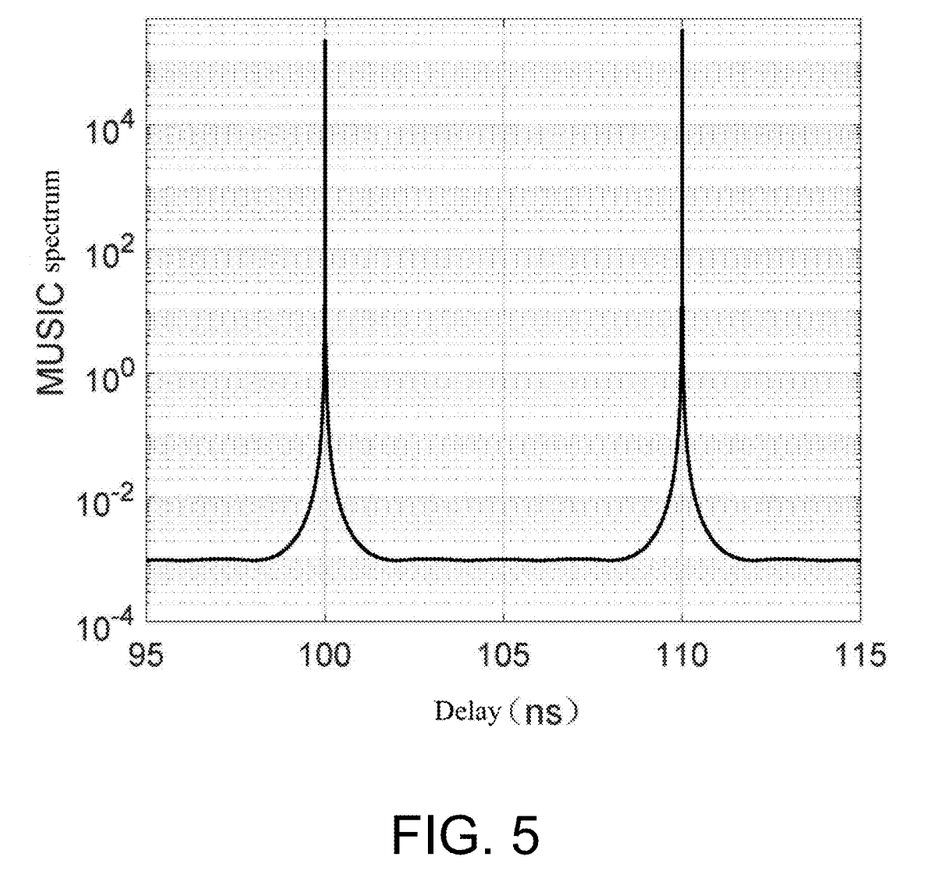
FIG. 5 is a diagram of a multipath delay result estimated in the embodiment of the present disclosure, where Ns=1024.

(3) An array element is selected as a reference point (the reference array elements at the receiver and the transmitter may be randomly selected, and their coordinates are set as the reference origins) separately at the receiver and the transmitter, and the delay parameter regarding multipath propagation is acquired according to the channel response of the reference array element. The delay parameter can be acquired by using a subspace method such as MUSIC or ESPRIT. Assuming that the channel response of the reference array element is $H_t \in C^{N_S \times N}$ herein, eigenvalue decomposition is performed for $H_t$, to obtain a noise subspace. Then, the delay parameter is estimated by means of the conventional subspace algorithm (reference may be made to "Multiple emitter location and signal parameter estimation" by R. Schmidt in IEEE Transactions on Antennas and Propagation). An estimation result of the delay parameter of the path is given in FIG. 5, where in the current operation, the simulation signal-to-noise ratio is 10 dB, the signal bandwidth is 500 MHz, the carrier frequency is 28 GHz, and the segment number $L_{seq}$ in the transmitted signal sequences is 300. Two delay resolvable paths are considered and each delay resolvable path contains 14 sub-paths. The number of the array elements is 12, which is less than the number of the sub-paths in the delay resolvable path. It can be seen from the figure that the two sets of delay can be correctly estimated.

(4) For the estimation of the two-dimensional departure angle, rows related to the receiver reference array element are selected from H to form a matrix $H_t$, and the following step (5) is performed. For the two-dimensional arrival angle, rows related to the transmitter reference array element are selected from H to form a matrix $H_r$, and then the following step (5) is performed, where the corresponding subscript 't' is replaced with the subscript 'r'.

(5) Channel matrix dimensionality and the operational amount are reduced by means of frequency domain smoothing; and the two-dimensional departure and arrival angles are estimated by using a channel matrix subjected to dimensionality reduction. Generally, the obtained $H_t$ has high dimensionality and needs to be subjected to smoothing and dimensionality reduction, so as to reduce the operation cost and the noise impact. A basic smoothing principle is given in FIG. 4. The channel response matrix $H_t$ is divided into P subarrays by rows, where P is the number of the subarrays obtained after division and also the number of smoothing operations, and generally can be divided by $N_s$; and each subarray contains channel responses of Ns/P frequency points. Because parameters such as $\omega^{hh}$, $\omega^{hv}$, $\omega^{vh}$, and $\omega^{vv}$ are known, the two-dimensional arrival angle is estimated by means of the reduced-rank subspace algorithm (RD-MUSIC) (reference may be made to "Direction finding with an array of antennas having diverse polarizations" by E. Ferrara and T. Parks in IEEE Transactions on Antennas and Propagation).

Figure 4:
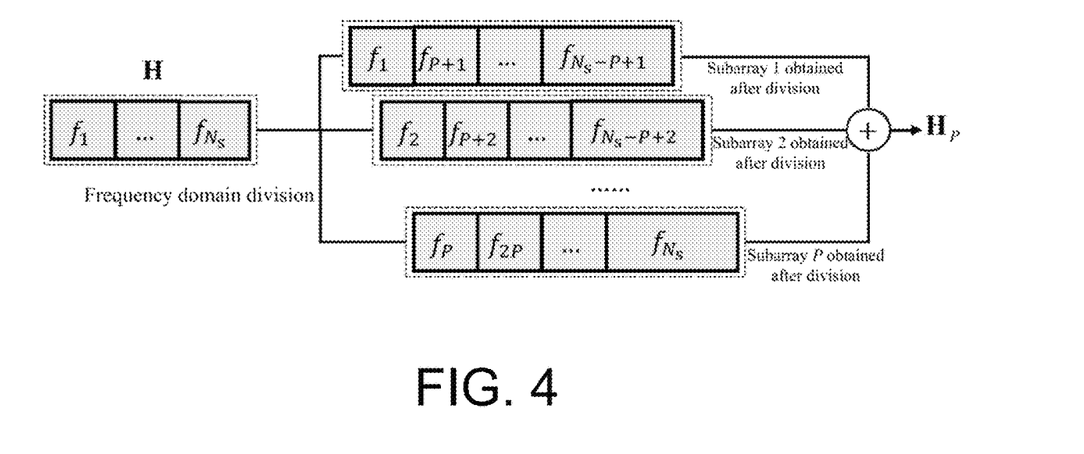
FIG. 4 is a schematic principle diagram of frequency domain smoothing technology in the embodiment of the present disclosure.

It should be noted in this step that, the array manifold corresponding to $H_{sm}$ that is obtained during summation of channel responses of the P subarrays obtained after division differs from the array manifold of each subarray by a phase shift factor. For example, for the transmitter, the phase shift factor is expressed as follows:

$$\Sigma_{t,P}=(\Phi_{t,0}+\Phi_{t,1}+\ldots+\Phi_{t,P-1}) \quad \text{(Formula 9)}$$

where $\Phi_{t,p}$ has the following expression:

$$\Phi_{t,p} = \begin{cases} 1_{6M_1N_s/P \times K}, & p=0 \\ [\phi_{t,11}, \ldots, \phi_{t,1K_1}, \ldots, \phi_{t,L1}, \ldots, \phi_{t,LK_L}], & p=1 \\ \Phi_{t,p-1} \odot \Phi_{t,1}, & p>1 \end{cases} \quad \text{(Formula 10)}$$

The operator $\odot$ denotes the Hadamard product operation, $1_{6M_tN_s/P \times K}$ denotes all 1's matrix with the dimensionality of $6M_tN_s/P \times K$, and $\Phi_{t,lk}$ has the following expression:

$$\phi_{t,lk} = \begin{bmatrix} \underbrace{e^{-j2\pi\Delta f(\tau_l+r_{t,1}u_{t,lk}/c)}, \ldots, e^{-j2\pi\Delta f(\tau_l+r_{t,1}u_{t,lk}/c)}}_{N_s/P}, \ldots, \\ \underbrace{e^{-j2\pi\Delta f(\tau_l+r_{t,6M_t}u_{t,lk}/c)}, \ldots, e^{-j2\pi\Delta f(\tau_l+r_{t,6M_t}u_{t,lk}/c)}}_{N_s/P} \end{bmatrix}^T \quad \text{(Formula 11)}$$

Figure 6:
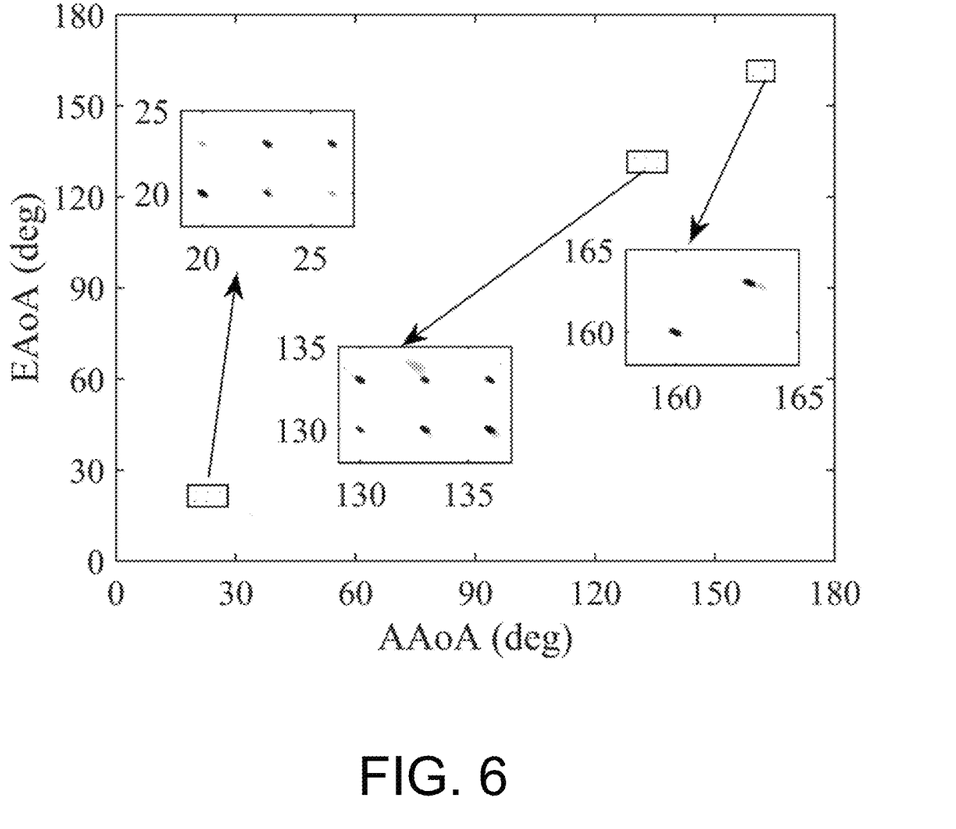
FIG. 6 is a diagram of an estimation result of two-dimensional arrival angles of sub-paths in a single time resolvable path in the embodiment of the present disclosure.
Figure 7:
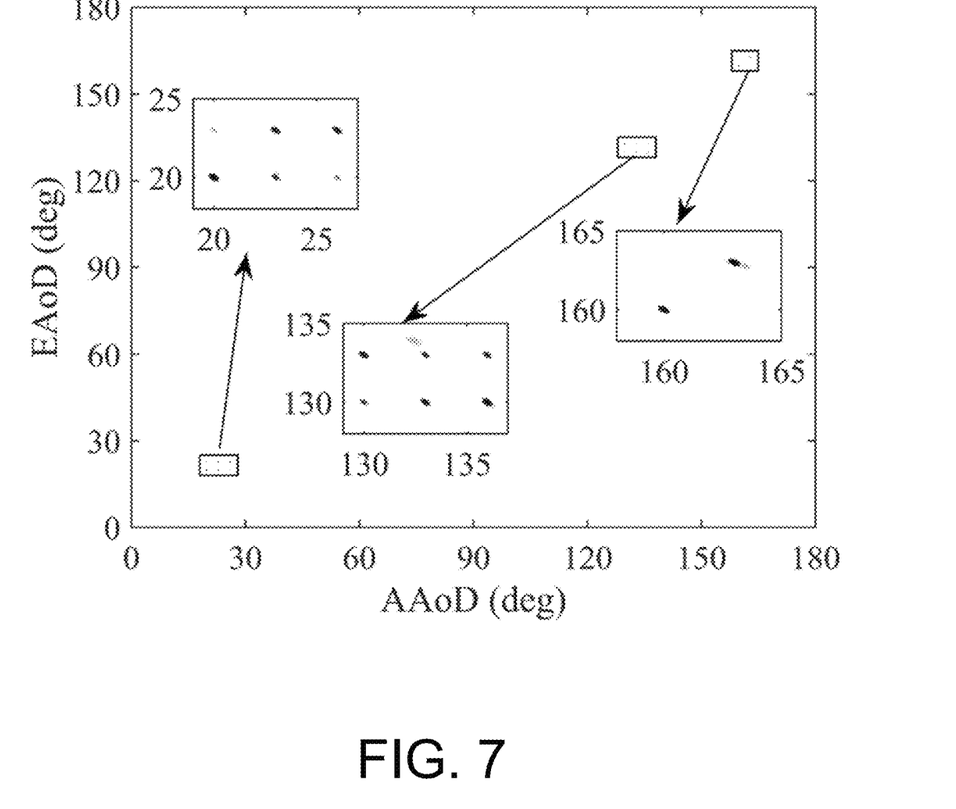
FIG. 7 is a diagram of an estimation result of two-dimensional departure angles of sub-paths in a single time resolvable path in the embodiment of the present disclosure.

In the foregoing formula, $\Delta f$ denotes an interval between frequency points, and the coordinates $r_{t,m}$ indicate the position coordinates of the mth antenna unit. For the arrival angle, $H_t$ in Formula (5) is replaced with $H_r$ with reference to Formula (4), and estimation is performed through method steps identical with those for the departure angle. The estimation results of the two-dimensional arrival and departure angles of the sub-paths are given in FIGS. 6 and 7. In the current operation, the simulation signal-to-noise ratio is 10 dB, the signal bandwidth is 500 MHz, the carrier frequency is 28 GHz, and the segment number $L_{seq}$ in the transmitted signal sequences is 300. FIGS. 6 and 7 show estimated MUSIC spectrums of sub-paths in one of the delay resolvable paths, where the delay resolvable path contains 14 sub-paths. The number of the array elements is 12, which is less than the number of the sub-paths in the delay resolvable path. Clear sub-path spectrum peaks can be seen in the figures, which indicates that the sub-paths can be correctly resolved.

(6) The estimated AoA and AoD are paired, and an array response at any frequency point is selected and defined as $H_{pair}$; and then eigenvalue decomposition is performed for $H_{pair}$, to obtain a noise subspace $U_{pair,n}$. An angle pair that can minimize the value of the following formula is found:

$$P_{pair} = \underset{\hat{\Theta}_{t,lk}, \hat{\Theta}_{r,lk}}{\arg\min} \det\{|A_{pair}^H(\hat{\Theta}_{r,lk}, \hat{\Theta}_{t,lk})U_{pair,n}U_{pair,n}^H A_{pair}(\hat{\Theta}_{r,lk}, \hat{\Theta}_{t,lk})|\} \quad \text{(Formula 12)}$$

where $A_{pair}(\hat{\Theta}_{r,lk}, \hat{\Theta}_{t,lk})$ can be expressed as follows:

$$A_{pair}(\hat{\Theta}_{r,lk},\hat{\Theta}_{t,lk}) = a_{t,f_i}(\hat{\Theta}_{t,lk}) \otimes [g_t^T(\hat{\Theta}_{t,lk}) \oplus A_{pdt f_i}^T(\hat{\Theta}_{t,lk})]^T \otimes a_{r,f_i}(\hat{\Theta}_{r,lk}) \otimes [g_r^T(\hat{\Theta}_{r,lk}) \oplus A_{pdr f_i}^T(\hat{\Theta}_{t,lk})]^T \quad \text{(Formula 13)}$$

$\hat{\Theta}_{r,lk}, \hat{\Theta}_{t,lk}$ in the foregoing formula denote the estimated two-dimensional arrival and departure angles. The top mark ^ in this embodiment indicates that the corresponding parameter is estimated.

(7) The parameters such as the cross-polarization ratios, the initial phases, and the amplitudes of the sub-paths are estimated by using the paired angle parameters, thus finally realizing estimation of the multi-dimensional parameters including the delay, the two-dimensional departure angle, the two-dimensional arrival angle, the cross-polarization ratio, the initial phase, and the amplitude. The matrix H can be expressed as $H=B\Gamma+Z$, where B is a total steering matrix, $\Gamma$ denotes a sub-path amplitude matrix in all snapshots, and Z is the white gaussian noise. Therefore, B can be written as $B=A\psi$, where A and $\psi$ are respectively expressed as follows:

$$A = \begin{bmatrix} A_{trf_1,11}e^{-j2\pi f_1 \tau_1} & \cdots & A_{trf_1,LK_L}e^{-j2\pi f_1 \tau_L} \\ \vdots & \ddots & \vdots \\ A_{trf_{N_s},11}e^{-j2\pi f_{N_s}\tau_1} & \cdots & A_{trf_{N_s},LK_L}e^{-j2\pi f_{N_s}\tau_L} \end{bmatrix} \quad \text{(Formula 14)}$$

$$\Psi = I_K \oplus [\bar{\beta}_{11}, \ldots, \bar{\beta}_{1K_1}, \ldots, \bar{\beta}_{L1}, \ldots, \bar{\beta}_{LK_L}] \quad \text{(Formula 15)}$$

where $$A_{trf_i,lk} = a_{tf_i,lk} \otimes [g_{t,lk}^T \oplus A_{pdtf_i,lk}^T]^T \otimes a_{rf_i,lk} \otimes [g_{r,lk}^T \oplus A_{pdrf_i,lk}^T]^T \quad \text{(Formula 16)}$$

$$\bar{\beta}_{lk} = \left[ e^{jw_{lk}^{vv}} \sqrt{K_{lk}^{-1}} e^{jw_{lk}^{hv}} \sqrt{K_{lk}^{-1}} e^{jw_{lk}^{vh}} e^{jw_{lk}^{hh}} \right]^T \quad \text{(Formula 17)}$$

$a_{tf_i,lk}$, $g_{r,lk}$ and $A_{pdtf_i,lk}$ are short for $a_r(f_i, \Theta_{t,lk})$, $g_r(\Theta_{r,lk})$ and $A_{pdt}(f_i, \Theta_{t,lk})$. A matrix $\hat{A}$ can be built according to the estimated angle and delay parameters. Let $\Pi=\Psi\Gamma$, and then $\hat{\Pi}=\hat{A}^+\hat{H}$, where the superscript '+' denotes pseudo inverse of the matrix. A column vector v is obtained by means of summation of $\hat{\Pi}$ by columns and is expressed as follows:

$$v=[v_{11}^T, \ldots, v_{LK_1}^T]^T \quad \text{(Formula 18)}$$

An initial value of the phase can be estimated as $\hat{\omega}=\arg\{v\}$, where arg denotes the operation of calculating the argument. The estimation of the cross-polarization ratio is expressed as follows:

$$\hat{\kappa}_{lk} = \left( \frac{|v_{lk}(1)| + |v_{lk}(4)|}{|v_{lk}(2)| + |v_{lk}(3)|} \right)^2 \quad \text{(Formula 19)}$$

In the foregoing formula, the numerals (1, 2, 3, 4) in the parentheses denote the first, second, third, and fourth elements of the vector $v_{l,k}$. $\hat{\Psi}$ can be built according to the estimated initial phase and cross-polarization ratio, and then the amplitude of all sub-paths in all snapshots can be estimated as $\hat{\Gamma}=\hat{\Psi}^+\hat{\Pi}$.

Figure 8:
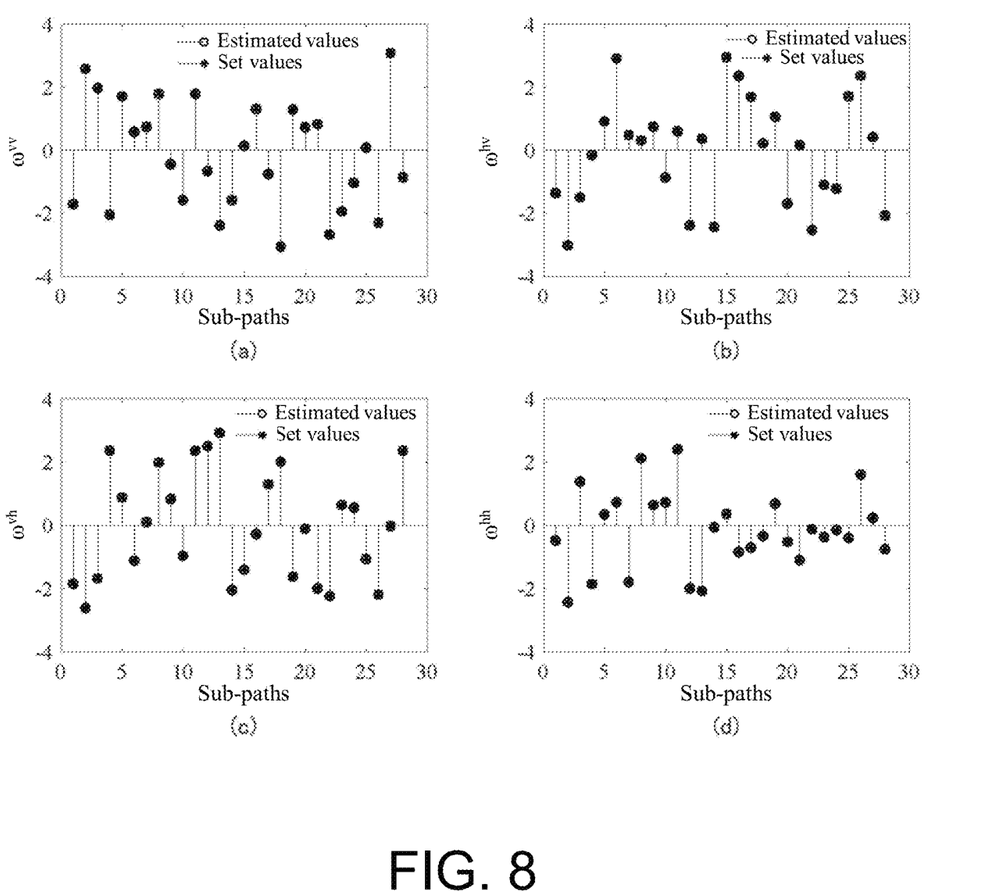
FIG. 8 is a diagram of an estimation result of initial phases in the embodiment of the present disclosure.
Figure 9:
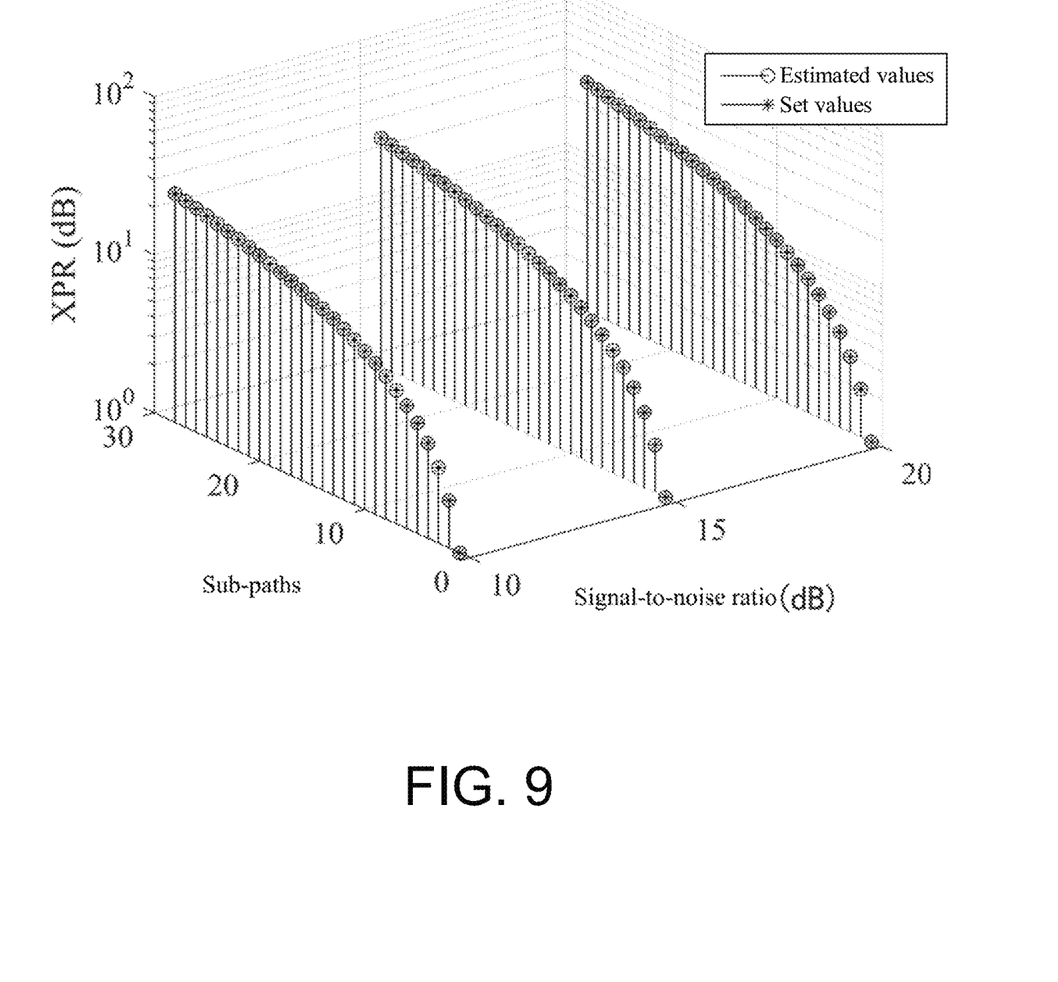
FIG. 9 is a diagram of an estimation result of cross-polarization ratios in different signal-to-noise ratios in the embodiment of the present disclosure.
Figure 10:
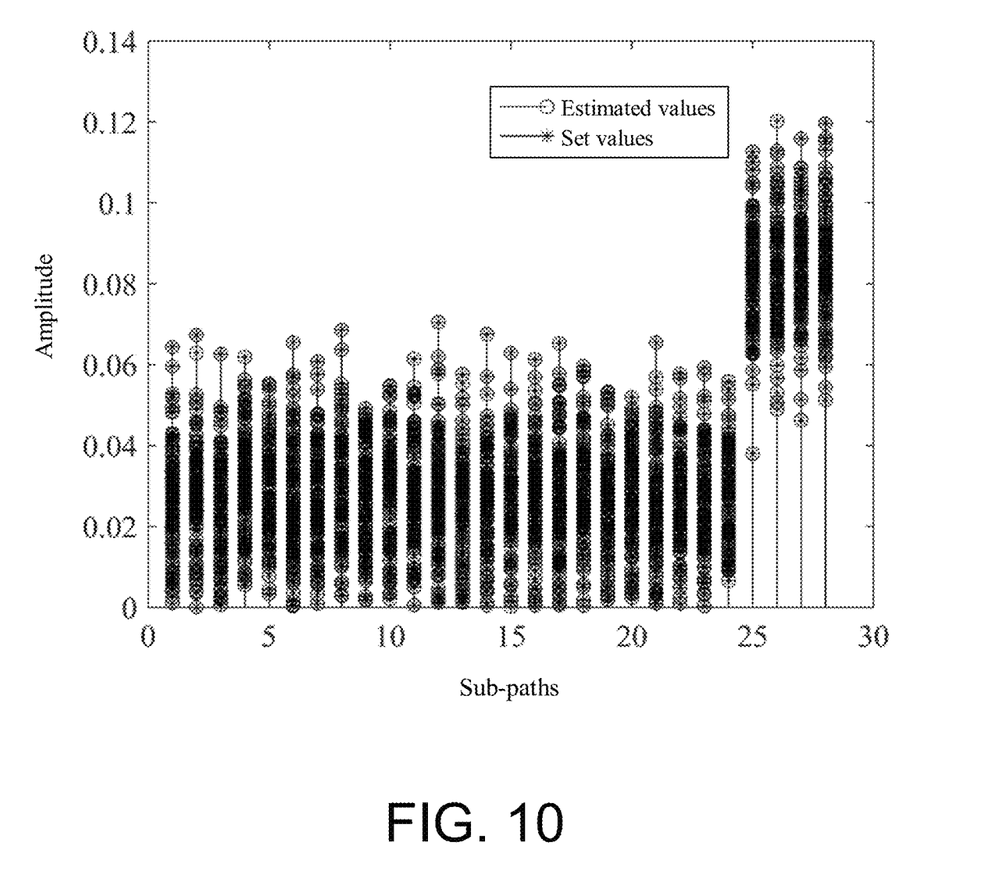
FIG. 10 is a diagram of an estimation result of the amplitude parameter in the embodiment of the present disclosure.

FIG. 8 gives an estimation result of the initial phases according to the algorithm of the present disclosure, FIG. 9 gives an estimation result of the cross-polarization ratios according to the algorithm of the present disclosure, and FIG. 10 gives an estimation result of the amplitude according to the algorithm of the present disclosure. The simulation parameters in FIGS. 8, 9, and 10 are consistent with those in FIGS. 5, 6, and 7. It can be easily seen from the estimation result diagrams that the initial phases, cross-polarization ratios, and amplitudes of the sub-paths are consistent with the corresponding set values. Therefore, these parameters can be accurately estimated by using the method of the present disclosure.

What is claimed is:

1. A method for estimating dense multipath parameters by means of multipolarized broadband extended array responses, comprising following steps:
    (1) transmitting multiple different transmitted signal sequences via a multipolarized antenna array, wherein a number of the transmitted signal sequences is equal to the number of transmitting antennas, each of the transmitted signal sequences is divided into different segments, a number of the segments in each of the transmitted signal sequences is not less than the number of the transmitting antennas, and a length of each of the segments of one of the transmitted signal sequence segments is not less than a number of Discrete Fourier Transform (DFT) points; and processing received data in multiple snapshots according to known transmitted signals, to obtain channel responses of multi-polarization components at all frequency points in a frequency band;
    (2) vectorizing an obtained channel responses at the frequency points in each snapshot into a column vector, and arranging the channel responses in different snapshots into a two-dimensional matrix, wherein each column in the two-dimensional matrix is corresponding to a response in one of the multiple snapshots, and each row indicates a response of a certain receiving and transmitting array element pair at a certain frequency point in the multiple snapshots;
    (3) estimating and acquiring a delay parameter regarding multipath propagation by using reference array elements; and
    (4) selecting rows related to receiver reference array elements from the two-dimensional matrix described in step (2) to form a first matrix, selecting rows related to transmitter reference array elements to form a second matrix, reducing a dimensionality of a channel matrix of one of the first and second matrices by means of frequency domain smoothing, and estimating two-dimensional departure and arrival angles by using the channel matrix subjected to dimensionality reduction.

2. The method for estimating dense multipath parameters by means of multipolarized broadband extended array responses according to claim 1, wherein the different transmitted signal sequences of which the number is identical with the number of the transmitting antennas are constructed, each of the transmitted signal sequences is divided into multiple subsequence segments, and the transmitted signal sequences are not required to be orthogonal as long as each subsequence matrix of a signal has full rank in a frequency domain.

3. The method for estimating dense multipath parameters by means of multipolarized broadband extended array responses according to claim 1, wherein each column of a re-built channel response matrix contains responses of each polarized receiving and transmitting array element at the all frequency points, and a number of columns of the channel matrix is equal to a number of the multiple snapshots.

4. The method for estimating dense multipath parameters by means of multipolarized broadband extended array responses according to claim 1, wherein the frequency domain smoothing refers to grouping all the frequency points into multiple sets of frequency points with a same length at equal intervals; and adding an array channel responses corresponding to the sets of frequency points and performing averaging, to obtain a channel response matrix with a less number of rows, wherein each row of the channel matrix subjected to the dimensionality reduction represents a sum of channel responses at a corresponding added frequency points, and a number of columns of the channel response matrix remains unchanged.

5. The method for estimating dense multipath parameters by means of multipolarized broadband extended array responses according to claim 1, further comprising: estimating parameters including an initial phase, an amplitude, and an cross-polarization ratio, which is specifically as follows:

building an array response by using the estimated angle and delay parameters; obtaining a third matrix containing the cross-polarization ratio, the amplitude in each of the snapshots, and the initial phase of each polarization combination by using a least square method; calculating an argument for the third matrix, to obtain initial phases of horizontal and vertical polarization combinations of all sub-paths; calculating the cross-polarization ratio by using a relationship between each column of an obtained matrix and the cross-polarization ratio; and finally, estimating amplitude information of each of the sub-paths in the different snapshots by using the least square method.

* * * * *